United States Patent [19]

Tamer et al.

[11] Patent Number: 5,459,789

[45] Date of Patent: Oct. 17, 1995

[54] PACKET TV PROGRAM COMPONENT DETECTOR

[75] Inventors: Gregory G. Tamer, Indianapolis; Michael S. Deiss, Zionsville, both of Ind.

[73] Assignee: Thomson Consumer Electronics, Indianapolis, Ind.

[21] Appl. No.: 232,785

[22] Filed: Apr. 22, 1994

[51] Int. Cl.⁶ ................................................. H04N 7/167
[52] U.S. Cl. ................... 380/20; 380/10; 380/17
[58] Field of Search ..................... 380/3, 4, 10, 20, 380/17

[56] References Cited

U.S. PATENT DOCUMENTS

| | | | |
|---|---|---|---|
| 5,168,356 | 12/1992 | Acampora et al. | 358/133 |
| 5,233,654 | 8/1993 | Harvey et al. | 380/20 |
| 5,289,276 | 2/1994 | Siracusa et al. | 348/467 |
| 5,347,635 | 9/1994 | Voeten et al. | 395/250 |

*Primary Examiner*—David C. Cain
*Attorney, Agent, or Firm*—Joseph S. Tripoli; Eric P. Herrmann; Ronald H. Kurdyla

[57] ABSTRACT

Apparatus for selecting predetermined ones of packets of signal components, from a signal stream of packets includes a control device, responsive to user selection and a transmitted program guide, for determining packet identifier codes, SCID's, for respective program signal components. The respective component SCID's are stored in programmable registers. SCID's, from respective packets in the signal stream, are successively loaded into a further register. Comparators which are associated with the programmable registers, compare the stored SCID's with the SCID's from packets in the signal stream. Output signals from the respective comparators control the utilization of the respective signal component packets in the signal stream. Programming of SCID's in the respective programmable registers is performed according to a schedule to preclude undesired data inadvertently being accepted by the system.

12 Claims, 6 Drawing Sheets

PACKET TV PROGRAM COMPONENT DETECTOR

This invention relates to apparatus for selecting audio/video program components from a signal stream including a plurality of time division multiplexed programs, each of which has a plurality of program components occurring in packet form,

BACKGROUND OF THE INVENTION

Traditional analog television programs have signal components which are frequency multiplexed in a relatively narrow contiguous spectral band, The program components are detected by bandpass filtering the requisite band, and then separating the respective components by varying techniques. Recently, much development work has been done in digital signal processes, such that it is currently possible and practical to transmit television programs digitally, The digital processes involve first compressing the respective program components, such as with transform processing, packaging the components in transport packets to provide a level of noise immunity, and transmitting the compressed components as pulse amplitude modulated, PAM, signals such as QPSK or QAM signals.

Compression processes are sufficiently efficient that several programs may be transmitted in a single analog television signal frequency band, a feature which can expand the limited resources of cable television and direct broadcast satellite DES, operators, A direct broadcast satellite system developed by Thomson Consumer Electronics and to be introduced in 1994, time division multiplexes a plurality of television programs onto each transponder of a satellite system, Each program may include a plurality of signal components such as a video component, one or two audio components, a data component for user interaction with the program or program provider, and possible other auxiliary components, Each component is provided in packet fore with each packet including a component payload and a component identifier SCID, SCID's are simply hinky numbers. In order to provide maximum system flexibility, the SCID's assigned respective components for the same program are different, Respective receiver devices therefore require apparatus to select appropriate component packets from a received signal stream in order to compose a transmitted program.

SUMMARY OF THE INVENTION

The present invention is apparatus for selecting predetermined ones of packets of signal components comprising a transmitted program from a signal stream of packets of a plurality of time division multiplexed programs. A control device, responsive to user selection and a transmitted program guide, determines from the program guide, packet identifier codes, SCID's, for the respective program signal components. The respective component SCID's are stored in programmable registers. SCID's, from respective packets in the signal stream, are successively loaded into a further register. Comparators are associated with the programmable registers and compare the stored SCID's with the SCID's from packets in the signal stream. Output signals from the respective comparators control the utilization of the respective signal component packets in the signal stream.

BRIEF DESCRIPTION OF THE DRAWINGS

The invention will be described with reference to the drawings, wherein.

DETAILED DESCRIPTION

Figure 1:
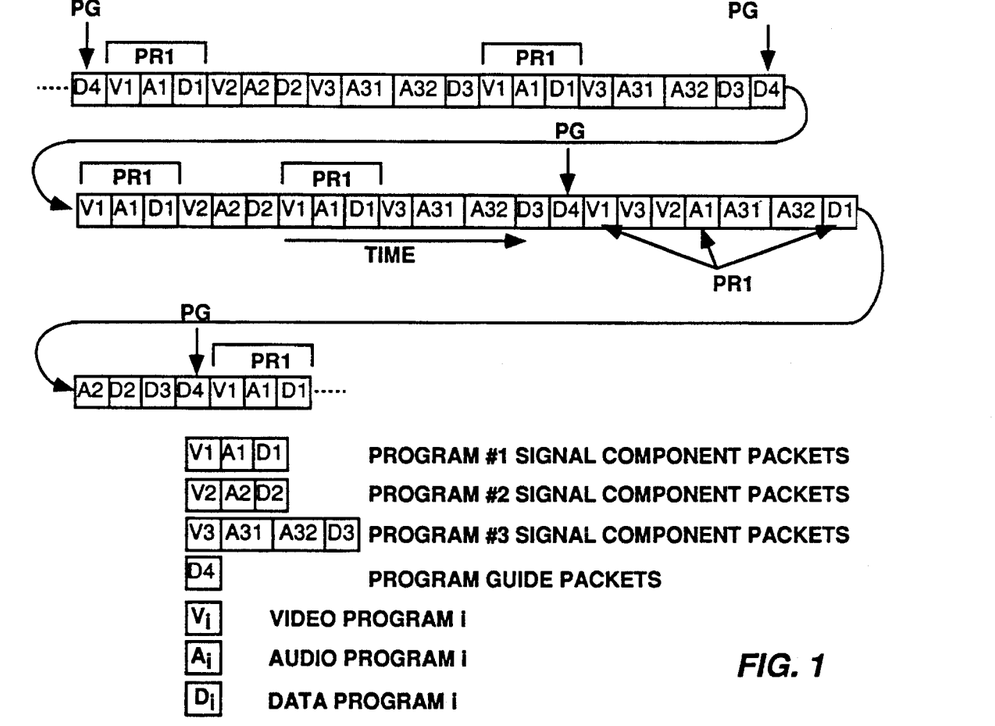
FIG. 1 is a pictorial representation of a time division multiplexed packet television signal.

FIG. 1 shows a signal stream consisting of a string of boxes which represent signal packets which are components of a plurality of different television or interactive television programs. These program components are assumed to be formed of compressed data and as such the quantity of video data for respective images is variable. The packets are of fixed length. Packets with letters having like subscripts represent components of a single program. For example, $V_i$, $A_i$, $D_i$ represent video, audio and data packets and packets designated $V_1$, $A_1$, $D_1$, represent video, audio and data for program 1, and $V_3$, $A_{31}$, $A_{32}$, $D_3$, represent video, audio 1, audio 2 and data components of program 3. In the upper line of the string of packets the respective components of a particular program are shown grouped together. However there is no necessity of packets from the same program being grouped as is indicated by the packet sequence shown in the middle of portion of the string of packets. Nor is there any particular order for the sequence of occurrence of respective components.

The string of packets shown in FIG. 1 represents three time division multiplexed programs, program 1, PR1, and programs 2 and 3, plus packets representing a program guide (packets D4). The program guide includes data which interrelates program components. The respective program components are assigned identifiers substantially independent of the program, and each component has a different identifier, SCID. For example SCID's assigned to the video, audio and data packets of program 2 may be 101111000110, 001101000111, and 101010101010 respectively.

Figure 2:
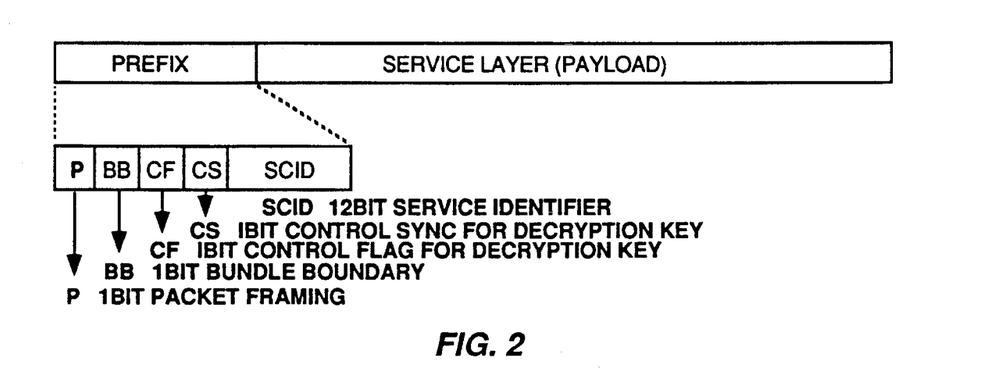
FIG. 2 is a pictorial representation of respective signal packets.

The respective packets are arranged to include a prefix and a payload as shown in FIG. 2. The prefix of this example includes two 8-bit bytes comprising five fields, four (P, BB, CF, CS) of which are 1-bit fields, and one (SCID) of which is a 12-bit field. For purposes of this description, only fields CF, CS and SCID are of interest. The SCID field is of course the signal component identifier. The field CF contains a flag to indicate whether the payload of the packet is scrambled, and the field CS contains a flag which indicates which of two alternative unscrambling keys is to be utilized to unscramble scrambled packets. The prefix of every packet is packet aligned, thus the location of the respective fields are easily identifiable.

Figure 3:
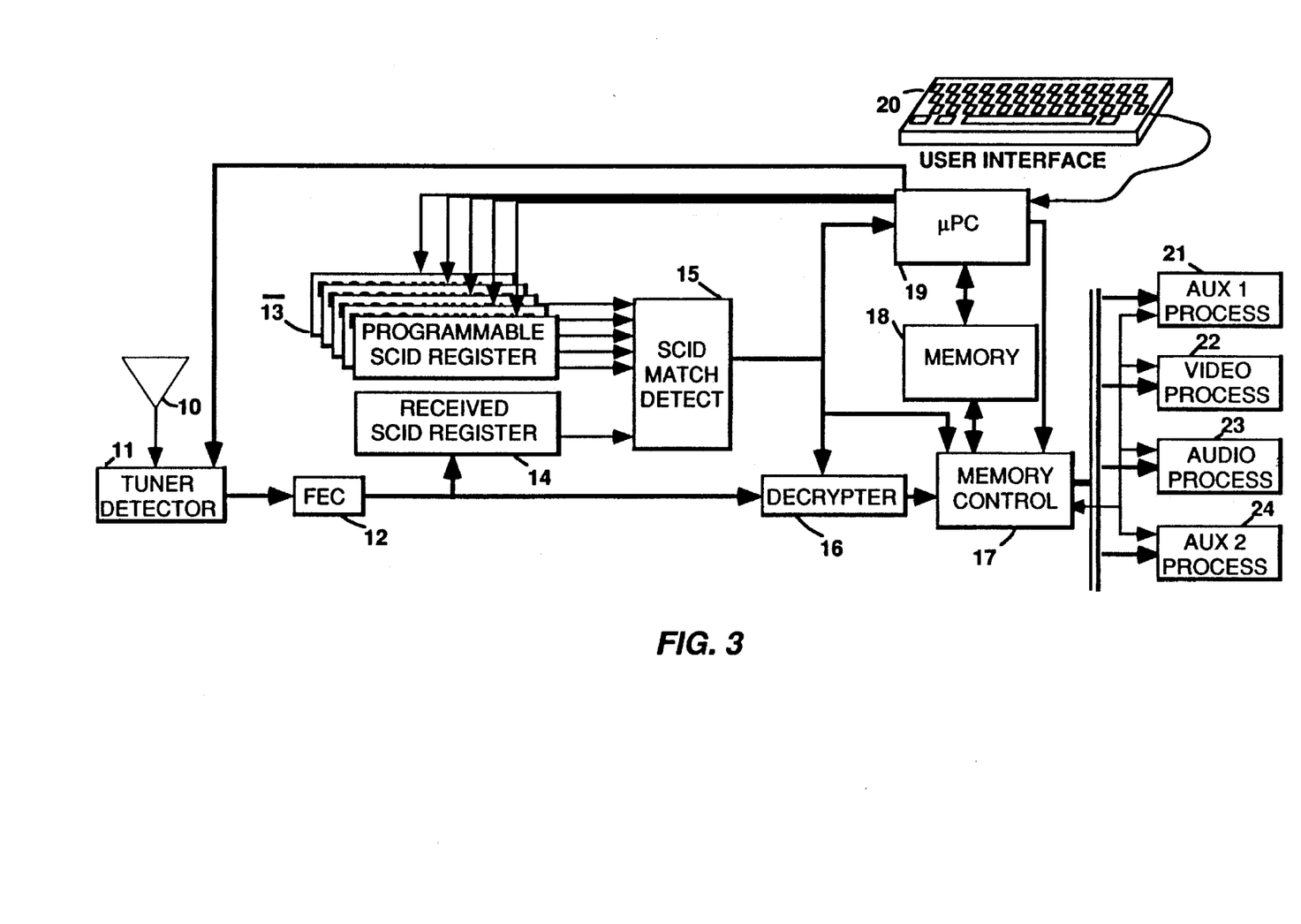
FIG. 3 is a block diagram of a receiver for selecting and processing packets of multiplexed component signals embodying the present invention.

FIG. 3 illustrates the packet detector as it relates to various elements of a digital television receiver. Signal is detected by an antenna 10 and applied to a tuner detector, 11, which extracts a particular frequency band of received signals, and provides baseband signal in a binary format. The frequency band is selected by the user through a microprocessor 19 by conventional methods. Nominally broadcast digital signals will have been error encoded using, for example, Reed-Solomon forward error correcting (FEC) coding. The baseband signals will thus be applied to a FEC decoder, 12. The FEC decoder 12 will synchronize the received video and provide a stream of signal packets of the type illustrated in FIG. 1. The FEC 12 may provide packets at regular intervals or on demand, by for example memory controller 17. In either case a packet framing or synchronizing signal is provided by the FEC circuit, which indicates the times that respective packet information is transferred from the FEC 12.

The detected frequency band may contain a plurality of time division multiplexed programs in packet form. To be useful, only packets from a single program should be passed to the further circuit elements. However the user has no knowledge of which packets to select. This information is contained in a program guide, which in itself is a program consisting solely of data which interrelates program signal components through SCID's. The program guide is a listing for each program, of the SCID's for the audio, video, and data components of respective programs. The program guide (packets D4 in FIG. 1) is assigned a fixed SCID. When power is applied to the receiver, the microprocessor 19 loads the SCID associated with the program guide into one of a bank of similar programmable SCID registers 13. The SCID field of the prefix portion of respective detected packets of signal from the FEC 12 are successively loaded in a further SCID register 14. The programmable registers and the received SCID register are coupled to respective input ports of a comparator circuit 15, and the received SCID is compared with the program guide SCID. If the SCID for a packet matches the program guide SCID, the comparator 15 conditions a memory controller 17 to route that packet to a predetermined location in the memory 18 for use by the microprocessor. If the received SCID does not match the program guide SCID, the corresponding packet is simply dumped.

The microprocessor waits for a programming command from the user via an interface 20, which is shown as a computer keyboard but which may be a conventional remote control, or receiver front panel switches. The user may request to view a program provided on channel 4 (in the vernacular of analog TV systems). The microprocessor 19 is programmed to scan the program guide list that was loaded in the memory 18 for the respective SCID's of the channel 4 program components, and to load these SCID's in respective other ones of the programmable registers of the bank of registers 13 which are associated with corresponding component signal processing paths.

Received packets of audio, video or data program components, for a desired program, must ultimately be routed to the respective audio 23, video 22, or auxiliary data 21, (24) signal processors respectively. The exemplary system of FIG. 3, first routes the respective packets to predetermined memory locations in the memory 18. Thereafter the respective processors 21-24 request the component packets from the memory 18. It should be appreciated that the signal components are compressed and that decompression devices do not require input data on a continuous basis. Routing the components through the memory provides a measure of desired signal throttling.

The audio, video and data packets are loaded into predetermined memory locations to enable the signal processors easy access to the component data. In order that the appropriate packets get loaded in the appropriate memory areas, the respective SCID comparators must be associated with those memory areas. This association may be hardwired in the memory controller 17, or the association may be programmable. If the former, specific ones of the programmable registers will always be assigned the audio, video and data SCID's respectively. If the latter the audio, video and data SCID's may be loaded in any of the programmable registers, and the appropriate association be programmed in the memory control 17 when the respective SCID's are loaded in the programmable registers.

In the steady state, after the program SCID's have been stored in the programmable registers 13, the SCID's of received signal packets are compared with all of the SCID's in the programmable SCID registers. If a match is made with either a stored audio, video or data SCID, the corresponding packet payload will be stored in the audio, video or data memory area respectively.

The respective signal packets are coupled from the FEC 12 to the memory controller 17 via a signal decryptor 16. Only the signal payloads are scrambled. Whether or not the packet is to be descrambled is determined by the CF flag in the packet prefix, and how it is to be descrambled is determined by the CS flag. If no SCID match is had for a respective packet, the decryptor may simply be disabled from passing any data. Alternatively, if there is no SCID match for a packet the decryptor may be allowed to decrypt according to its last settings and the memory write control may be disabled to dump the respective packet.

Figure 4:
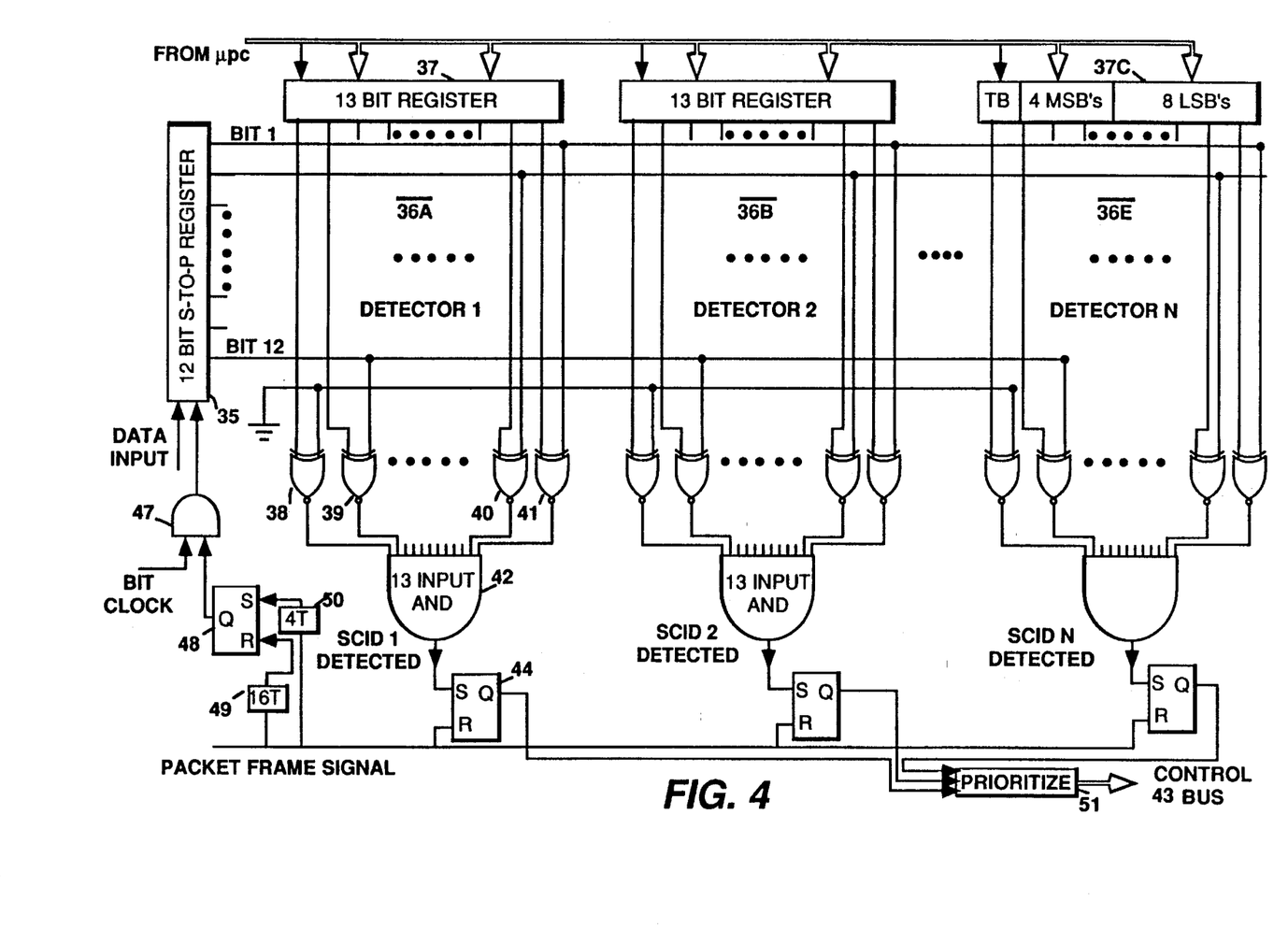
FIG. 4 is a logic schematic diagram of a bank of SCID detectors.

FIG. 4 illustrates exemplary register-comparator circuitry which may be used for the elements 13-15 in FIG. 3. FIG. 4 includes a plurality of similar register comparator circuits 36A-36E. Each of these circuits includes a 13-bit parallel-output register 37 into which is loaded one of the component SCID's from the microprocessor 19. The parallel output connections are respectively coupled to respective first input connections of a plurality of 13 two-input exclusive NOR circuits, XNOR's 38-41. A further register, which in this example is a 12-bit serial-input-parallel-output register 35, is successively loaded with the 12-bit SCID of the current signal component packet. The output connections of this register are respectively coupled to the second input connections of bit-corresponding 12 XNOR gates of all of the circuits 36A-36E. The second input connection of the 13$^{th}$ XNOR gate is coupled to ground potential and its utility will be discussed below. Each of the circuits 36A-36E includes a 13-input AND circuit to which the output connections of the 13 XNOR gates are coupled. Whenever the SCID loaded into register 35 matches the SCID programmed into one of the registers of circuits 36A-36E, the AND gate of the corresponding circuit will exhibit a low to high transition indicating the match.

The output connections of the respective AND gates are coupled to the set input connection of a set-reset flip-flop, 44, which is edge triggered. The reset input of the flip-flop 44 is coupled to the packet framing pulse. The packet framing pulse, in this example, is assumed to be a pulse which goes from logic low to logic high at the beginning of a packet, and stays at a logic high for the duration of the packet. The respective flip-flops are therefore reset to a logic low at the beginning of each packet, and will thereafter be set to a logic high by a transition of the associated AND gate going from a logic low to a logic high, when a match is detected. The packets are assumed to be in bit-serial format, in this example, and respective bits of the packet are clocked out of the FEC 12 by a bit clock. A match can occur only after a SCID is loaded into the register 35, which occurs 16 bit-clock periods after the leading transition of the packet framing pulse.

The packet SCID's are clocked into the register 35 by the bit-clock which is applied to the register 35 through an AND gate 47. The AND gate 47 is enabled to pass the bit-clock only during the interval that the SCID occurs in the packet bit stream. The enable pulse is generated by an edge triggered set-reset flip-flop 48 which is set by a replica of the packet framing signal that is delayed by four bit-clock periods and is reset by a further replica of the packet framing signal that is delayed by sixteen bit-clock periods. The flip-flop 48 outputs an enable signal which is 12-bit clock periods in duration and occurs four bit-clock periods after the beginning of the respective packets.

Similar circuitry may be arranged to load byte serial signals into a current SCID register if data provided by the FEC (for an alternative system) is byte serial. Those skilled in the art of digital circuitry will readily be able to accommodate the comparator circuitry to the input signal format.

Figure 5:
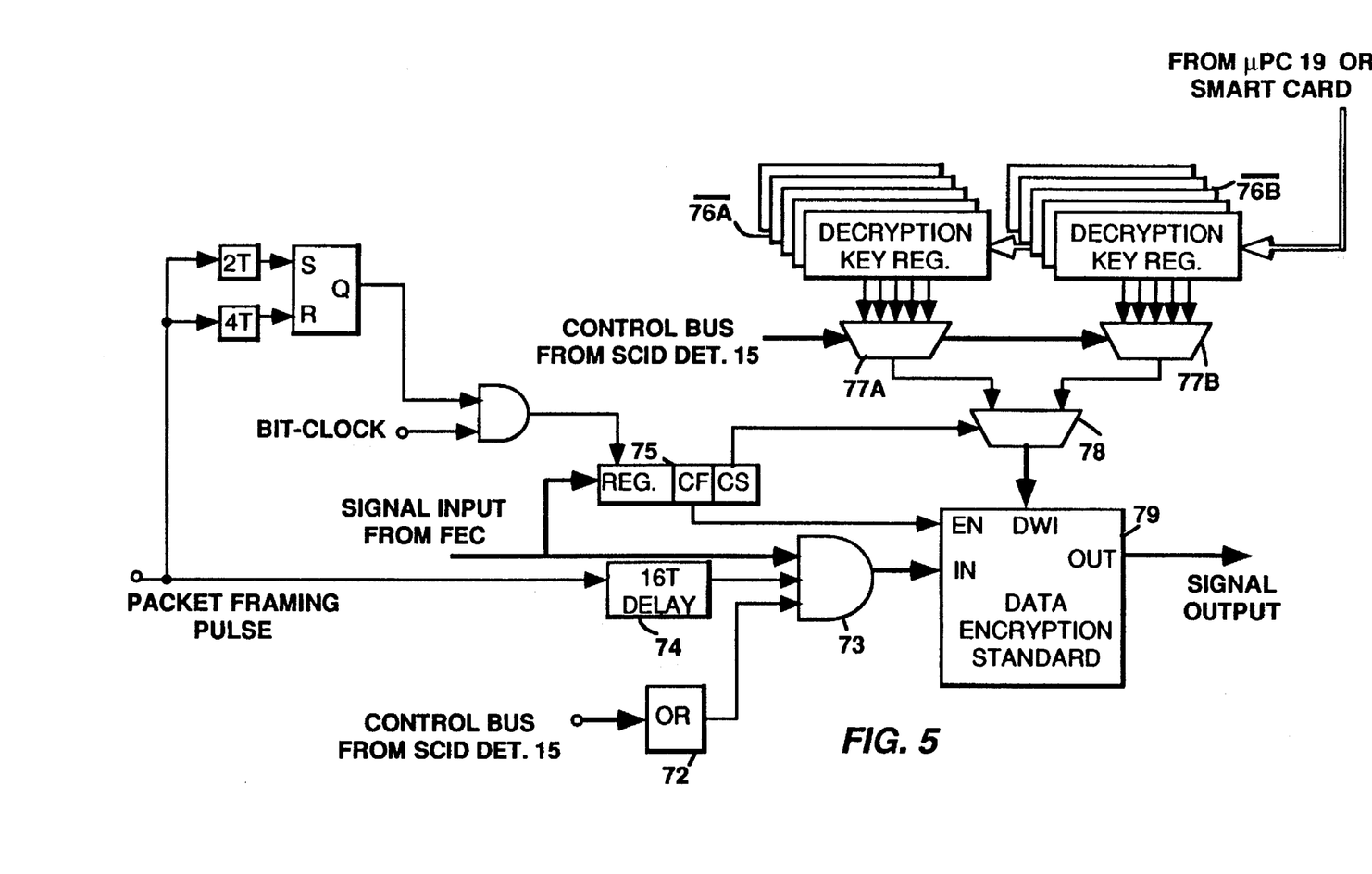
FIG. 5 is a block diagram of exemplary decryption apparatus for element 16 of FIG. 3.

FIG. 5 shows exemplary decryption apparatus which may be implemented for the decryptor 16 of FIG. 3. The signal packets are decrypted by a conventional decryptor, 79, which is conditioned to perform descrambling according to descrambling words applied to a descrample word input, DWI. The packets are applied to the decryptor, 79, via an AND gate, 73, which is enabled 16 bit-clock periods after the leading transition of the packet framing pulse. Enabling the AND gate in this manner excises the packet prefix, which has no further use.

The AND gate 73 is also enabled by an OR circuit 72 which is responsive to the SCID detector 15. If any one of the programmed SCID's is matched, the OR 72 provides an enabling signal which allows the packet payload to enter the decryptor. If there is no SCID match, the AND gate 73 in effect dumps the current packet of data.

The scramble flags CF and CS are clocked and stored in a register 75. The CF flag is coupled to an enable input connection EN of the decryptor. Responsive to the flag exhibiting a logic one level, the decryptor is conditioned to pass the signal from the FEC unaltered. That is no descrambling is performed. Alternatively if the CF flag exhibits a logic low level, descrambling is performed by the decryptor.

Each program component may have two unique descrambling codes. These descrambling codes are stored in two sets of decryption registers 76A and 76B. The registers 76A have respective output connections coupled to a multiplexor 77A, and the registers 76B have respective output connections coupled to a multiplexor 77B. The multiplexors 77A and 77B have respective output connections coupled to a two-to-one multiplexor 78. The multiplexor 78 has a control electrode coupled to be responsive to the control flag CS in the register 75. If the flag CS is a logic high or logic low the decryption key is selected from a register in bank 76A or 76B respectively. The multiplexors 77A and 77B are controlled by the SCID detector output signal to select the decryption key register in the bands 76A and 76B associated with the current packet output by the FEC 12.

The registers 76A and 76B may be loaded with fixed decryption key values. However to provide scrambling flexibility, the preferred embodiment provides for registers 76A and 76B which may be programmed with decryption keys either from the microprocessor 19 or a smart card interface (not shown).

Figure 6:
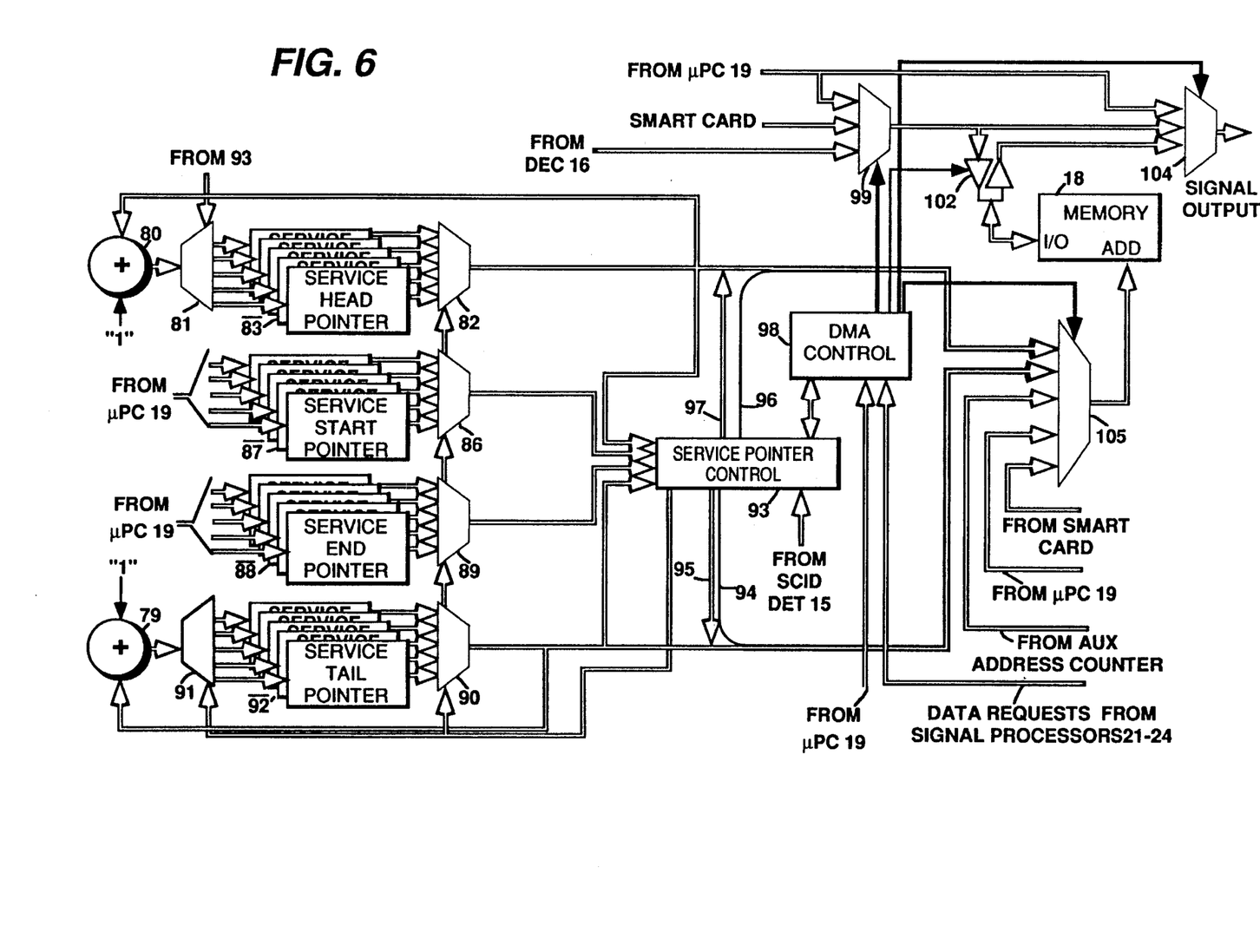
FIG. 6 is a block diagram of exemplar memory management circuitry which may be implemented for element 17 of FIG. 3.

FIG. 6 illustrates exemplary apparatus for the memory controller 17 shown in FIG. 3. This figure is included to illustrate elements which are interrelated to programming the registers 13 in FIG. 3. Each program component is stored in a different contiguous block of the memory 18. In addition other data, such as data generated by the microprocessor 19 or a Smart Card (not shown) may be stored in the memory 18.

Memory addresses are applied by a multiplexor 105, and memory input data is applied by a multiplexor 99. Output data is provided by a further multiplexor 104. Output data provided by the multiplexor 104 is derived from the multiplexor 19, the memory 18 or directly from the multiplexor 99. Program data is presumed to be of standard picture resolution and quality, and occurring at a particular data rate. On the other hand high definition television signals, HDTV, occur at a significantly higher data rate. Practically all data provided by the FEC will be routed through the memory 18 via the multiplexor 99, except for the higher rate HDTV signals which may be routed directly to the multiplexor 104.

Memory addresses are provided to the multiplexor 105, from program addressing circuitry 79–97, from the microprocessor 19, from the Smart Card apparatus and possibly from other auxiliary devices. Selection of the particular address at any particular time period is controlled by a direct memory access DMA, circuit 98. The SCID control signals and "data needed" signals from respective signal processors are applied to the DMA 98, and responsive thereto, memory access contention is arbitrated. The DMA 98 cooperates with a Service Pointer Controller 93, to provide the appropriate read or write addresses for respective program signal components.

The respective addresses for the various signal component memory blocks are generated by four groups of program component or service pointer registers 83, 87, 88, and 92. The starting pointers for respective blocks of memory, into which respective signal components are stored, are contained in registers 87 for the respective signal components. The start pointers may be fixed values, or they may be calculated by conventional memory management methods in the microprocessor 19.

The last address pointers for respective blocks are stored in the bank of service registers 88, one for each potential program component. Similar to the start addresses, the end addresses may be fixed values or they may be calculated values provided by the microprocessor 19. Using calculated values for starting and end pointers is preferred because it provides a more versatile system with less memory.

The memory write pointers or head pointers are generated by the adder 80 and the service head registers 83. There is a service head register for each potential program component. A write or head pointer value is stored in a register 83, and provided to an address multiplexor 105 during a memory write cycle. The head pointer is also coupled to the adder 80, wherein it is incremented by one unit, and the incremented pointer is stored in the appropriate register 83 for the next write cycle. The registers 83 are selected by the service pointer controller, 93, for the appropriate program component currently being serviced.

In this example it is assumed that the start and end pointers are 16-bit pointers. The registers 83 provides 16 bit write or head pointers. The memory 18, on the other hand has 18-bit addresses. The 18-bit write addresses are formed by concatenating the two most significant bits of the start pointers to the 16-bit head pointers, with the start pointer bits in the most significant bit positions of the combined 18-bit write address. The start pointers are provided by the respective registers 87 to the service pointer controller 93. The service pointer controller parses the more significant start pointer bits from the start pointers stored in registers 87, and associates these bits with the 16-bit head pointer bus. This is illustrated by the bus 96 shown being combined with the head pointer bus exiting the multiplexor 85.

Similarly, memory read pointers or tail pointers are generated by the adder 79 and the service tail registers 92. There is a service tail register for each potential program component. A read or tail pointer value is stored in a register 92, and provided to the address multiplexor 105 during a memory read cycle. The tail pointer is also coupled to the adder 79, wherein it is incremented by one unit, and the incremented pointer is stored in the appropriate register 92 for the next read cycle. The registers 92 are selected by the service pointer controller, 93, for the appropriate program component currently being serviced.

The registers 92 provides 16 bit tail pointers. 18-bit read addresses are formed by concatenating the two most significant bits of the start pointers to the 16-bit tail pointers, with the start pointer bits in the most significant bit positions of the combined 18-bit write address. The service pointer controller parses the more significant start pointer bits from the start pointers stored in registers 87, and associates these bits with the 16-bit tail pointer bus. This is illustrated by the bus 94 shown being combined with the tail pointer bus exiting the multiplexor 90.

Data is stored in the memory 18 at the calculated address. After storing a byte of data, the head pointer is incremented by one and compared to the end pointer for this program component, and if they are equal the more significant bits of the head pointer are replaced with the lower 14 bits of the start pointer and zeros are placed in the lower two bit positions of the head pointer portion of the address. This operation is illustrated by the arrow 97 pointing from the service pointer controller 93 to the head pointer bus from the multiplexor 82. It is presumed that application of the lower 14 start pointer bits override the head pointer bits. Replacing the head pointer bits with the lower start pointer bits in the address causes the memory to scroll through the memory block designated by the upper two start pointer bits, thus obviating reprogramming write addresses at the start of each packet to a unique memory location within a block.

For the case in which the head pointer is now equal to the tail pointer (used to indicate where to read data from the memory 18) a signal is sent to the interrupt section of the microprocessor to indicate that a head tail crash has occurred. Further writing to the memory 18 from this program channel is disabled until the microprocessor re-enables the channel. This case is very rare and should not occur in normal operation.

Data is retrieved from the memory 18 at the request of the respective signal processors at addresses calculated by the adder 79 and registers 92. After reading a byte of stored data, the data the tail pointer is incremented by one and compared to the end pointer for this logical channel in the service pointer controller 93. If the tail and end pointers are equal then the tail pointer is replaced with the lower 14 bits of the start pointer and zeros in the lower two bits. This is illustrated by the arrow 95 emanating from controller 93 and pointing to the tail pointer bus from the multiplexor 90. If the tail pointer is now equal to the head pointer then the respective memory block is defined as empty and no more bytes will be sent to the associated signal processor until more data is received from the FEC for this program channel.

Memory read/write control is performed by the service pointer controller and direct memory access, DMA, elements 93 and 94. The DMA is programmed to schedule read and write cycles. Scheduling is dependent upon whether the FEC 12 is providing data to be written to memory or not. FEC data write operations take precedence. In the exemplary apparatus illustrated in FIG. 6, there are four types of apparatus which may access the memory. These are Smart Card (not shown), the FEC 12 (more precisely the decryptor 16), the microprocessor 19 and one of the application devices such as the audio and video processors. Memory contention is handled in the following manner. The DMA, responsive to data requests from the various processing elements listed above allocates memory access as follows. Access to the memory is provided in 95 nS time slots during which a byte of data is read from or written to the memory 18. There are two major modes of access allocation, defined by the FEC Providing Data, or the FEC Not Providing Data respectively. For each of these modes the time slots are allocated as follows, assuming a maximum FEC data rate of 5 Mbytes/second, or one byte for each 200 nS. These are:

FEC Providing Data

1) FEC data write;
2) Application device read/Microprocessor read/write;
3) FEC data write;
4) Microprocessor read/write; and for FEC Not Providing Data 1) Smart Card read/write;
2) Application device read/Microprocessor read/write;
3) Smart Card read/write;
4) Microprocessor read/write.

Because FEC data writes cannot be deferred, the FEC (or more correctly the decryptor), when providing data must be guaranteed memory access during each 200 nS interval. Alternate time slots are shared by the application devices and the microprocessor. When there is no data available for the requesting devices, the microprocessor is provided use of the application time slots.

The Controller 93 communicates with the SCID detector to determine which of the respective Start, head and end pointer registers to access for memory write operations. The controller 93 communicates with the DMA to determine which of the start, end and tail registers to access for memory read operations. The DMA 98 controls selection of the corresponding addresses and data by the multiplexors 99, 104 and 105.

Consider that it is desired to reprogram one of the SCID registers 13 without changing the remaining SCID registers. This may occur, for example, when it is desired to change to a different one of multiple audio components, without interfering with processing of the other signal components. This activity requires changing pointers in respective ones of the registers 83, 87, 88 and 92, as well as allocating memory space etc., all of which requires finite time. Since reprogramming cannot be performed instantaneously, if reprogramming is not carried out in a prescribed sequence, there is a high probability that undesired data provided by the FEC may encroach one of the signal processors and cause a system "crash".

The preferred reprogramming sequence is performed as follows. When a program component is to be de-selected by removing its SCID from one of the registers 13, the microprocessor is programmed to test the SCID detector output control bus to determine if that channel is currently active, i.e., it is currently processing that program component packet. If it is active the system waits until that service of the SCID detector output goes inactive. After that program component goes inactive the four most significant bits of the new SCID are loaded into the appropriate register. In addition a logic high toggle bit is loaded into the TB-bit position of the register, see FIG. 4. The toggle bit is applied to the 13$^{th}$ XNOR gate and is a different logic level than the other input connection of the 13$^{th}$ XNOR. This insures that the AND gate 42 is disabled and consequently, that particular program service or channel is inactivated. (Note all 12 bits are not simultaneously loaded into the register 37 in this example because the load data bus is considered to be only 8-bits wide.) In addition the memory management circuitry has as yet not been reconfigured to accommodate the SCID change. Therefore, before loading the LSB's of the SCID into the register 37, the memory management circuits are reconfigured under control of the microprocessor 19, and then the eight LSB's of the SCID are loaded into register 37, after which the toggle bit is set low to reactivate that program channel or service.

The inventors have found that it is particularly prudent to prioritize the SCID control signals. It is possible, and sometimes desirable, that the same SCID is loaded in more than one SCID register. It then becomes necessary to insure that the system can accommodate the simultaneous detection of the SCID by two or more detectors. The respective SCID are prioritized according to a hierarchy established by the system designer. In the current example the respective detectors 36A–36E are prioritized in that order. Thus if a SCID is detected by detector 36A and others of detectors 36B–36E, an output control signal will be provided by detector 36A but the output control signals for all other detectors 36B–36E will be inhibited. Alternatively, if detector 36A does not detect the current SCID but detector 36B, and other ones of the detectors 36C–36E do detect the current SCID, a control signal will be provided for detector 36B while the output of detectors 36C–36E are inhibited. Similarly if detector 36C is the highest ordered detector in the hierarchy set forth above, to detect the current SCID, the output signals of detectors 36D–36E will be inhibited and so forth.

Figure 7:
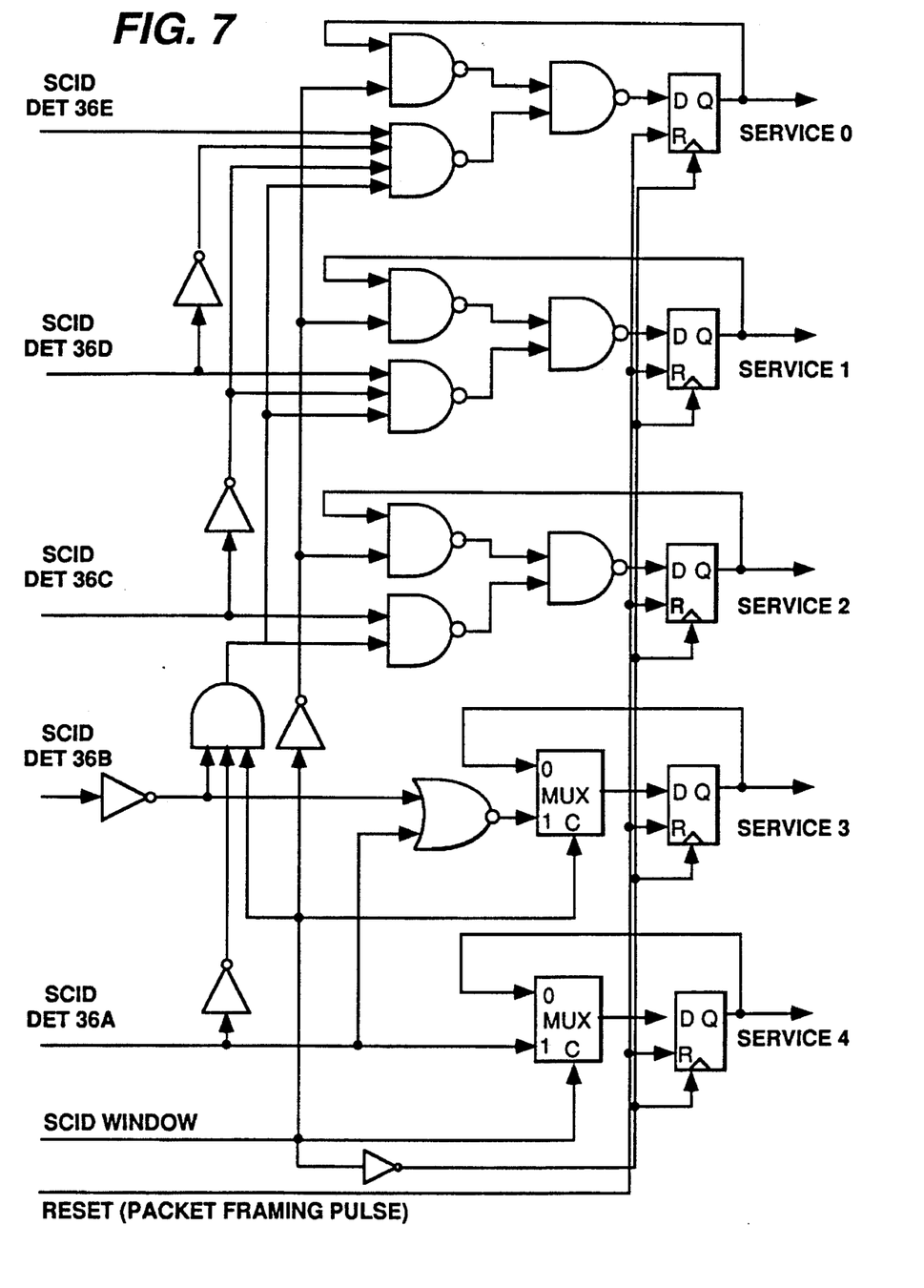
FIG. 7 is a schematic diagram of prioritization circuitry.

Output control signal prioritization is performed by the circuit element 51 of FIG. 4. Exemplary circuitry to perform this function is illustrated in FIG. 7. This is a familiar thermometer decoder and need not be described in detail.

What is claimed is:

1. In a receiver for processing recorded or transmitted audio, video and data program signal components, wherein respective program signal components occur in signal packets including a signal payload and a service channel identifier, SCID, with different components having different SCID's, apparatus comprising:

a source of signal including said program signal components;

SCID detection means, responsive to said signal, for determining SCID's associated with respective components of respective programs;

a plurality of signal processors including an audio signal processor, a video signal processor, and a-data signal processor, a plurality of programmable matched filters, coupled to said source, and which are selectively programmed with signal component SCID's, respective said programmable matched filters for detecting signal packets occurring in said signal, which contain SCID's identical to a SCID with which it is programmed, for applying corresponding detected signal program components to an associated signal processor; and means coupled to said SCID detection means for programming said plurality of programmable matched filters with SCID's, associated with a desired program.

2. The apparatus set forth in claim 1 wherein a respective programmable matched filter comprises:

a register having a plurality of storage elements at least equal in number to the number of bits of respective SCID's, having an input port for applying an SCID, a plurality of ordinally numbered output connections respectively associated with each bit of an SCID from least significant bit to most significant bit, a further register, having a plurality of storage elements at least equal in number to the number of bits of respective SCID's, having an input port coupled to said source for loading at least portions of said signal to its storage elements, and having a plurality of ordinally numbered output connections respectively associated with respective storage elements; and logical comparing means arranged for providing a control signal when evey signal exhibited at the ordinally number output connections of the further register are all equivalent to signal exhibited at like ordinally numbered output connections of said register.

3. The apparatus set forth in claim 2 wherein said programmable matched filters include means for disabling said logical comparing means from providing said control signal.

4. The apparatus set forth in claim 2 wherein said logical comparing means includes a plurality of exclusive NOR circuits, ones of which have respective first input connections coupled to respective SCID bit output connections of said register and respective second input connections connected to like ordinally numbered SCID bit output connections of said further register.

5. The apparatus set forth in claim 4 wherein said logical comparing means further includes means for determining when all of said exclusive NOR circuits exhibit a similar output state.

6. The apparatus set forth in claim 5 wherein said logical comparing means includes a further exclusive NOR circuit having a first input connection connected to a predetermined logic value, and a second input connection coupled to a source of selectable logic values, and having an output connected to said means for determining when all of said exclusive NOR circuits exhibit a similar output state, said source of selectable logic values being conditioned to apply a logic level opposite said predetermined logic value to disable said means for determining when all of said exclusive NOR circuits exhibit a similar output state when said programmable matched filters are reprogrammed.

7. The apparatus set forth in claim 5 wherein said source of selectable logic values includes a further storage element in said register.

8. The apparatus set forth in claim 1 further including prioritizing apparatus coupled to respective output connections of said plurality of programmable matched filters, for simultaneously passing only a single output control signal from said output connections, and wherein the matched filters are prioritized for which output control signal will be passed if more than one matched filter concurrently provides an output control signal.

9. In a receiver for processing recorded or transmitted audio, video and data program signal components, wherein respective program signal components occur in signal packets including a signal payload and a service channel identifier, SCID, with different components having different SCID's, a method for detecting program components comprising:

providing a signal including said program signal components;

determining from said signal, SCID's associated with respective components of respective programs;

programming a plurality of programmable matched filters with SCID's determined from said signal;

matched filtering said signal with said plurality of programmable matched filters, to determine the occurrence of SCID's programmed into said programmable matched filters;

coupling said signal to respective audio, video and data processing elements responsive to the detection of corresponding SCID's.

10. The method set forth in claim 9, further including prioritizing the programmable matched filters such that for concurrent determination of an SCID by more than one of said programmable matched, responses by all but one of the programmable matched filters is inhibited.

11. The method set forth in claim 9 wherein said receiver includes memory management means which is reconfigurable to accommodate respective program components, respective matched filters include programmable registers and the step of programming the programmable matched filters includes;

determining if a respective matched filter which is to be reprogrammed is currently providing a control signal, and if it is providing a control signal waiting until said control signal terminates;

reprogramming said programmable register with a partial new identifier and concurrently inhibiting the matched filter from providing an output;

reconfiguring said memory management means;

reprogramming said programmable register with a remainder of said new identifier; and enabling the output response of said matched filter.

12. In programmable apparatus for detecting predetermined signal packets of data containing desired program components from a stream of signal packets by detecting predetermined identifiers within respective packets, including programmable registers programmed with N-bit identifiers of said predetermined packets (N an integer), and respective comparing means coupled to respective programmable registers for generating control signals when an N-bit identifier contained in said programmable register matches an N-bit identifier contained in a signal packet in said stream of signal packets, and further including memory management means which is reconfigurable to accommodate respective said program components, a method of reprogramming said programmable registers comprising:

determining if a respective comparing means coupled to a programmable register which is to be reprogrammed is currently providing a control signal, and if it is providing a control signal waiting until said control signal terminates;

reprogramming said programmable register with a partial new identifier and concurrently disabling said comparing means;

reconfiguring said memory management means;

reprogramming said programmable register with a remainder of said new identifier; and enabling said comparing means.

* * * * *

US005459789C1

(12) REEXAMINATION CERTIFICATE (4662nd)

United States Patent
Tamer et al.

(10) Number: US 5,459,789 C1
(45) Certificate Issued: Oct. 29, 2002

(54) PACKET TV PROGRAM COMPONENT DETECTOR

(75) Inventors: Gregory G. Tamer, Indianapolis, IN (US); Michael S. Deiss, Zionsville, IN (US)

(73) Assignee: Thomson Consumer Electronics, Inc., Indianapolis, IN (US)

Reexamination Request:
No. 90/005,739, Jun. 7, 2000

Reexamination Certificate for:
Patent No.: 5,459,789
Issued: Oct. 17, 1995
Appl. No.: 08/232,785
Filed: Apr. 22, 1994

(51) Int. Cl.[7] ............................................. H04N 7/167
(52) U.S. Cl. ...................... 380/241; 380/212; 348/426.1
(58) Field of Search ................................ 380/216, 217, 380/240, 241; 370/392; 348/426.1

(56) References Cited

PUBLICATIONS

Alvarez et al., "HDTV: The Engineering History"., Dec. 10, 1999, Retreived from the Internet:<URL: http://web.mit.edu/6.933/www/HDTV.pdf>.*

1994 Proceedings, 48th Annual Broadcast Engineering Conference Proceedings, Las Vegas, Nevada, Mar. 20–24, 1994, (National Association of NAB Broadcasters), Grand Alliance HDTV System Specification, Chapter V—Transport System, pp. 1–64.

* cited by examiner

Primary Examiner—Gilberto Barrón, Jr.

(57) ABSTRACT

Apparatus for selecting predetermined ones of packets of signal components, from a signal stream of packets includes a control device, responsive to user selection and a transmitted program guide, for determining packet identifier codes, SCID's, for respective program signal components. The respective component SCID's are stored in programmable registers. SCID's, from respective packets in the signal stream, are successively loaded into a further register. Comparators which are associated with the programmable registers, compare the stored SCID's with the SCID's from packets in the signal stream. Output signals from the respective comparators control the utilization of the respective signal component packets in the signal stream. Programming of SCID's in the respective programmable registers is performed according to a schedule to preclude undesired data inadventently being accepted by the system.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–12 is confirmed.

* * * * *